(12) United States Patent
Kratish et al.

(10) Patent No.: US 6,357,716 B1
(45) Date of Patent: Mar. 19, 2002

(54) TOOL FOR HANGING AN OBJECT

(76) Inventors: Lawrence Kratish, 8741 Lake Dasha Ter., Plantation, FL (US) 33324; Martin L. Kratish, 5200 SW. 115$^{th}$ Ave., Cooper City, FL (US) 33330

( * ) Notice: Subject to any disclaimer, the term of this patent is extended or adjusted under 35 U.S.C. 154(b) by 0 days.

(21) Appl. No.: 09/565,663

(22) Filed: May 5, 2000

Related U.S. Application Data (63) Continuation-in-part of application No. 09/504,593, filed on Feb. 15, 2000, which is a continuation-in-part of application No. 09/192,748, filed on Nov. 16, 1998, which is a continuation-in-part of application No. 08/970,598, filed on Nov. 14, 1997, now Pat. No. 5,927,675, which is a continuation-in-part of application No. 08/795,251, filed on Feb. 10, 1997, now abandoned.

(51) Int. Cl.$^7$ .............................. A47D 1/14; A47G 1/16; A47G 1/06; B06R 1/02; A47F 7/14
(52) U.S. Cl. ..................... 248/466; 248/916; 248/475.1; 40/713
(58) Field of Search ................................. 248/465, 460, 248/466, 470, 475.1, 477, 495, 496, 916; 40/713, 757; 33/613, 42

(56) References Cited

U.S. PATENT DOCUMENTS

| | | | |
|---|---|---|---|
| 1,005,499 A | | 10/1911 | Baker |
| 1,908,147 A | | 5/1933 | Hoegger |
| 2,641,527 A | | 6/1953 | Krogh |
| 2,952,431 A | | 9/1960 | Pedley |
| 4,212,123 A | | 7/1980 | Robin |
| 4,241,510 A | * | 12/1980 | Radecki ........................ 33/613 |
| 4,295,625 A | | 10/1981 | Degger et al. |
| 4,597,554 A | | 7/1986 | James |
| 4,936,033 A | * | 6/1990 | Lacko ........................... 40/765 |
| 5,080,317 A | * | 1/1992 | Letizia ......................... 248/466 |
| 5,103,573 A | * | 4/1992 | Ehling ........................... 33/613 |
| 5,303,598 A | | 4/1994 | Hart |
| 5,314,159 A | | 5/1994 | Szarata |
| 5,433,416 A | * | 7/1995 | Johnson .................... 248/475.1 |
| 5,758,858 A | * | 6/1998 | Barnes ..................... 248/475.1 |
| 5,801,891 A | * | 9/1998 | Lloyd ...................... 248/475.1 |
| 5,878,987 A | * | 3/1999 | Hayde ......................... 248/477 |
| 5,906,349 A | * | 5/1999 | Roy ............................ 248/496 |
| 5,915,806 A | * | 6/1999 | Levee ............................ 33/42 |

* cited by examiner

*Primary Examiner*—Ramon O. Ramirez
*Assistant Examiner*—Jerome DeLuca
(74) *Attorney, Agent, or Firm*—Herbert L. Lerner; Laurence A. Greenberg; Werner H. Stemer (57) ABSTRACT

An object hanging tool includes an elongated body member having at least one removable insert holder for removably fastening, to the body member, an insert for receiving and guiding a fastener to be secured to a structure. The insert holder is slidably disposed at an edge of the body member, and has a holder opening with a holder opening edge and a recessed border formed at least partly around the opening edge. The recessed border self-secures to an overhanging edge of the insert upon placing the insert into the holder opening. The recessed border can have a protrusion and the overhanging edge can have a recess, or vice-versa, the recess aligned with and corresponding to the protrusion. A shape of the recessed border can correspond with or be slightly smaller than a shape of the overhanging edge. The inserts are each configured to receive and guide fasteners such as nails and screws. One insert includes a removable or fixed level positioned at any angle with respect to the frame hanging tool for indicating whether the fasteners received in the inserts are aligned level with respect to each other. The body member also can have a removable or fixed level. As such, a person is assured that the object being hung will be level with respect to the Earth. Another insert can have a gripping hole for releasably holding a fastener.

40 Claims, 6 Drawing Sheets

TOOL FOR HANGING AN OBJECT

CROSS-REFERENCE TO RELATED APPLICATION

This application is a continuation-in-part of application Ser. No. 09/504,593, filed Feb. 15, 2000, which is a continuation-in-part of allowed application Ser. No. 09/192,748, filed Nov. 16, 1998, which is a continuation-in-part of U.S. Pat. No. 5,927,675, issued Jul. 27, 1999, which is a continuation-in-part of application Ser. No. 08/795,251, filed Feb. 10, 1997, now abandoned.

BACKGROUND OF THE INVENTION

1. Field of the Invention

The invention relates, generally, to a tool that assists in hanging an object on a structure, and more specifically, it relates to determining the placement of fasteners, such as nails, screws, pegs, mollies, hooks, and bull hooks, for hanging pictures, frames, carpets, sculptures, and the like, on a given plane and horizontal, vertical, or at a given angle with respect to one another.

2. Description of the Related Art

Various devices are known that assist in hanging pictures and like objects so that the object will hang level. However, there remains a need for an improved method for hanging objects, including framed works and similar items, that will hang securely in a level position.

U.S. Pat. No. 2,952,431 to Pedley teaches a cross bar which attaches to the back of a frame of an item to be hung on a wall. At the bottom of the frame there is secured an end piece into which the cross bar is held. The cross bar can be maneuvered within the confines of the end piece such that the frame can be leveled out should the frame initially be off center. The Pedley device requires time, effort and expense to secure the cross bar and the end piece to the frame.

U.S. Pat. No. 5,303,895 to Hart teaches an apparatus that is attached to a frame before the frame is mounted to a surface such as a wall. The Hart apparatus has a built in level for assisting in the proper placement of the apparatus on the frame. The apparatus contains areas in which fasteners may be inserted to attach the frame and the apparatus to the wall. The Hart device also requires time, effort and expense to secure the apparatus to the frame.

As set forth above, the invention is a continuation-in-part of a related invention described in U.S. patent application Ser. No. 09/504,593, filed Feb. 25, 2000. The invention in that application describes a hanging tool with an elongated body member and a plurality of openings formed in the body member. Each of the plurality of openings has an opening edge and a recessed border formed at least partly around the opening edge. That invention also includes at least one insert for receiving and guiding a fastener to be secured to a structure. The inserts have an overhanging edge and are inserted in one of the openings in the body member. The recessed border of the openings self-secure to the overhanging edge of the inserts for removably fastening the inserts to the body member.

The instant invention improves the invention described in the preceding paragraph. Instead of a body member with openings for receiving various inserts at particularly defined locations within the body member, the instant invention includes a body member with a system for slidably receiving separate inserts at an infinite number of locations along the body member.

SUMMARY OF THE INVENTION

It is accordingly an object of the invention to provide a tool for hanging any object, including frames, that overcomes the herein-mentioned disadvantages of the heretofore-known devices and methods of this general type, that assists in hanging an object perfectly level on a surface, and that is easy to use and inexpensive to manufacture.

The invention is a tool that sets the proper placement of fasteners such as nails, screws, pegs, mollies, hooks, bull hooks, and the like for hanging objects such as pictures, frames, sculptures, and other items on the fasteners or devices attached to the fasteners. The invention may also be advantageously used to hang multiple objects on the same plane at an even or desired spacing, whether level with respect to ground or at a particular angle with respect to one another or to ground.

With the foregoing and other objects in view, there is provided, in accordance with the invention, an object hanging tool, including an elongated body member having at least one edge, at least one insert for receiving and guiding a fastener to be secured to a structure, the at least one insert having an overhanging edge, and at least one removable insert holder for removably fastening the at least one insert to the body member, the at least one insert holder slidably disposed at the at least one edge and having a holder opening with a holder opening edge and a recessed border formed at least partly around the opening edge, the recessed border self-securing to the overhanging edge of the at least one insert upon placing the at least one insert into the holder opening.

In accordance with another feature of the invention, the body member has at least one rail opening, the at least one insert holder has at least one rail guide, and the at least one rail guide is slidably disposed in the at least one rail opening.

In accordance with a further feature of the invention, the body member has a rear side, the at least one insert holder has a front side, the at least one rail guide is on the front side, and the at least one rail opening is on the rear side.

In accordance with an added feature of the invention, the body member has a top side, the at least one insert holder has a bottom side, the at least one rail guide is on the bottom side, and the at least one rail opening is on the top side.

In accordance with an additional feature of the invention, the at least one insert holder has at least one rail opening, the body member has at least one rail guide, and the at least one rail guide is slidably disposed in the at least one rail opening.

In accordance with yet another feature of the invention, the body member has a rear side, the at least one insert holder has a front side, the at least one rail guide is on the rear side, and the at least one rail opening is on the front side.

In accordance with yet a further feature of the invention, the body member has a top side, the at least one insert holder has a bottom side, the at least one rail guide is on the top side, and the at least one rail opening is on the bottom side.

In accordance with yet an added feature of the invention, the at least one rail opening and the at least one rail guide are trapezoidal or barbell shaped.

In accordance with again an added feature of the invention, the at least one rail opening has entrance edges and the entrance edges are tapered.

In accordance with still another feature of the invention, the at least one rail guide has end edges and the end edges are tapered.

In accordance with still an added feature of the invention, the body member has a given thickness and the at least one insert holder has a thickness equal to the given thickness.

In accordance with still an additional feature of the invention, the body member has a given thickness and the at least one insert holder has at least one step with a width equal to the given thickness.

In accordance with another feature of the invention, the body member has two edges, and the at least one insert holder is slidably disposed on at least one of the two edges.

In accordance with a further feature of the invention, the recessed border is formed with at least one protrusion and the overhanging edge is formed with at least one recess aligned with and corresponding to the at least one protrusion for removably fastening the at least one insert to the at least one insert holder.

In accordance with an added feature of the invention, the overhanging edge has the at least one protrusion and the recessed border has the at least one recess aligned with and corresponding to the at least one protrusion for removably fastening the at least one insert to the body member.

In accordance with an additional feature of the invention, the recessed border has a depth and the at least one protrusion has a thickness corresponding to the depth of the recessed border.

In accordance with yet a further feature of the invention, the at least one protrusion and the at least one recess are curved.

In accordance with yet an additional feature of the invention, the at least one protrusion has a width, the recessed border has a breadth, and the width corresponds to the breadth.

In accordance with again a further feature of the invention, the recessed border has a border shape, the overhanging edge has an edge shape, and the border shape substantially corresponds to the edge shape.

In accordance with again an added feature of the invention, the recessed border has a border shape, the overhanging edge has an edge shape, and the edge shape is larger than the border shape.

In accordance with again an additional feature of the invention, the overhanging edge has a tapered corner.

In accordance with still another feature of the invention, the at least one insert has a front side and a back side, the at least one insert holder has a front side and a back side, and the recessed border and the front and back sides of the at least one insert respectively lie flush with the front and back sides of the at least one insert holder when the at least one insert is placed into the opening of the at least one insert holder.

In accordance with still a further feature of the invention, the at least one insert is one of a plurality of inserts including a leveling insert having a level for determining if a plurality of fasteners are aligned level with respect to each other, and a fastener guiding insert for receiving and aligning a fastener.

In accordance with still an added feature of the invention, the leveling insert has a removable level.

In accordance with still an additional feature of the invention, the leveling insert has a recess for receiving the level oriented at an angle.

In accordance with another feature of the invention, the elongated body member has at least one cavity and includes at least one level removably disposed in the at least one cavity.

In accordance with a further feature of the invention, the fastener guiding insert has a fastener guide path and a semicircular hole at the fastener guide path for receiving and guiding the fastener, and the semicircular hole releasably grips the fastener.

In accordance with an added feature of the invention, the body member has at least one end with an end opening formed therein, and including an end connector received in the end opening of the body member for removably joining adjacent body members together at an angle with respect to one another.

In accordance with an additional feature of the invention, the at least one insert holder has a front side and a back side, and the recessed border is at least partly around the opening edge on both the front side and the back side of the at least one insert holder.

In accordance with yet another feature of the invention, there is provided at least one measurement scale at the at least one edge.

In accordance with yet an additional feature of the invention, the recessed border is entirely around the opening edge.

In accordance with a concomitant feature of the invention, the removable insert holder includes a fastener for removably securing the insert holder (60) to the body member.

Other characteristic features of the invention are set forth in the appended claims.

Although the invention is illustrated and described herein as embodied in a tool for hanging an object, it is nevertheless not intended to be limited to the details shown because various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

BRIEF DESCRIPTION OF THE DRAWINGS

FIG. 9 is a diagrammatic, front elevational view of the body member of FIG. 2a with two insert hangers of FIGS. 2b, 2c in an installed position.

DESCRIPTION OF THE PREFERRED EMBODIMENTS

In all the figures of the drawing, sub-features and integral parts that correspond to one another bear the same reference symbol in each case.

Figure 1:
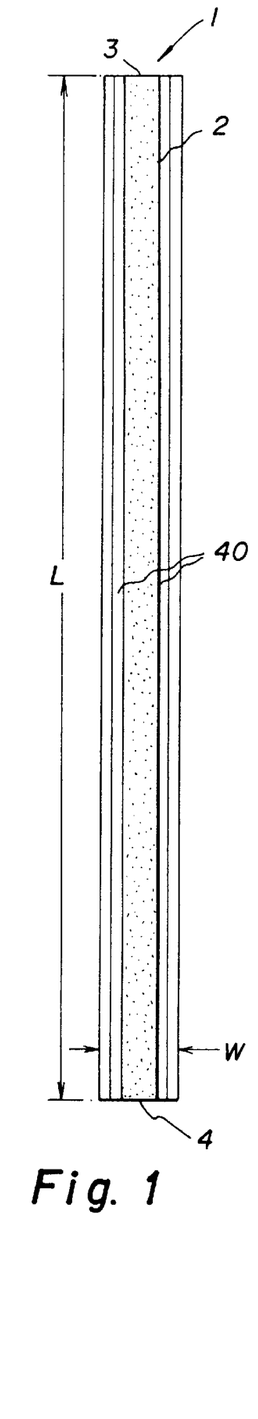
FIG. 1 is a diagrammatic, reduced, front elevational view of a body member of an object hanging tool in accordance with the invention.
Figures 2A, 2B, 2C, 2D, 3:
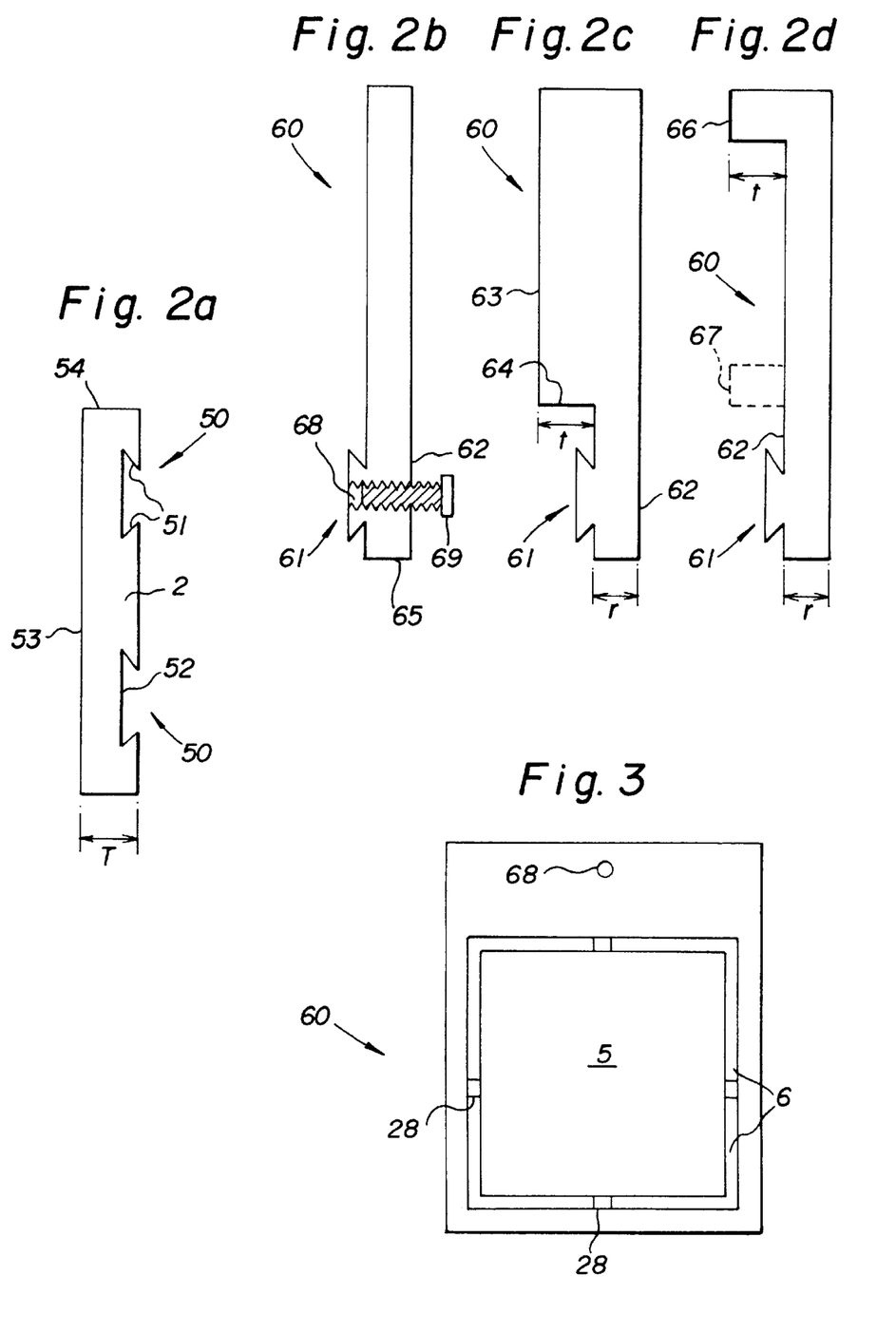
FIG. 2*a* is a diagrammatic, side elevational view of an alternative embodiment of the body member of FIG. 1.
FIG. 2*b* is a diagrammatic, cross-sectional view of an insert holder for the body member of FIG. 2*a*.
FIG. 2*c* is a diagrammatic, side elevational view of an alternative embodiment of the insert holder of FIG. 2*b*.
FIG. 2*d* is a diagrammatic, side elevational view of an alternative embodiment of the insert holder of FIG. 2*b*.
FIG. 3 is a diagrammatic, front elevational view of an insert holder to be attached to the body member of FIG. 1 or FIG. 2*a*.

Referring now to the figures of the drawings in detail and first, particularly, to FIG. 1 thereof, there is shown an object hanging tool 1 having an elongated body member 2 with a rectangular shape. The body member 2 has a first end 3, a second end 4, a length L, a width W, and a thickness T (FIG. 2a). The length L of the body member 2 is arbitrary (i.e., 6 inches to 10 feet), but is preferably a length of 1 foot, 18 inches, 2 feet, 3 feet, and 1 meter. The width W of the body member 2 is arbitrary, but is preferably in the range of 1 to 5 inches. The thickness T of the body member 2 is arbitrary, but is preferably in the range of ⅛ inch to 1 inch.

The body member 2 is ideally made out of a lightweight, pliable material that can traverse irregular surfaces. The body member 2 can be made out of various materials including plastic, metal, wood, and composite materials. Although, the object hanging tool 1 is preferably in a rectangular shape, other shapes such as squares, triangles, circles, irregular rectangles, and the like are possible.

Preferably, as shown in FIG. 2a, the body member 2 is formed with two rail openings 50 that traverse the entire body member 2 along the length L of the body member 2. The rail openings 50 are preferably on the same side of the body member 2, but can be on either or both sides. The body member 2 can also only have one rail opening 50, which is preferably centered with respect to the width W and traverses the entire length L of the body member 2.

The two rail openings 50 are defined by interior sides 51 and an interior bottom 52. The rail openings 50 can be formed of any shape, but are illustrated as trapezoidal. The openings can also be circular, semi-circular, or T-shaped.

Received in the rail openings 50 of the body member 2 is a corresponding rail guide 61 of a separate insert holder 60. See FIGS. 2b, 2c, 2d, and 3. Preferably, each of the separate insert holders 60 is rectangular in shape (FIG. 3) and has one rail guide 61 (FIGS. 2b to 2d) disposed on a rail guide stub 62 of the insert holder 60. Preferably, each insert holder 60 has two relevant thicknesses, a rail guide stub thickness r (FIGS. 2c and 2d), and a holder overlap thickness t. In the preferred embodiment, the holder overlap thickness t is equal to the body member thickness T. Therefore, in the inserted position, the side 53 of the body member 2 lies flush with the side 63 of the insert holder 60 of FIG. 2c or the side 66 of the insert holder 60 of FIG. 2d, and the step 64 of the insert holder 60 lies flush against the side 54 of the body member 2. The preferred configuration, therefore, provides bearing surfaces 51, 54, 64 that counteract forces tending to tear the rail guide 61 out of the corresponding rail opening 50 when inserted therein. Additionally, the body member 2 can have a thickness in its central region that extends to cover side 65 of the insert holder 60 much like the overlap thickness t of FIG. 2c extending over side 54 of the body member 2. It is possible for the degree of slidability of the rail guide 61 within the rail opening 50 to be variable. In order to fix the insert holder 60 at a particular location on the body member 2, for example, to hold the insert holder 60 steady when the body member 2 is placed vertical as shown in FIG. 1, the rail guide stub 6 preferably has a threaded bore 68 for receiving a screw tightener 69. See FIG. 2b. As the screw tightener 69 is turned to travel into the threaded bore 68, the end of the inserted portion of the screw tightener 69 projects out a side of the rail guide 61 and contacts the interior bottom 52 of the body member 2 and produces a force against the interior bottom 52. The insert holder 60 then is fixedly secured at a given position because the force against the interior bottom 52 presses the sides of the rail guide 61 firmly against the interior sides 51 of the rail opening 50. Alternatively, the threaded bore 68 can be placed anywhere on the insert holder 60 such that a force is placed against the body member 2 when the screw tightener 69 is turned to travel into the threaded bore 68. The screw tightener 69 can also be replaced with any securing device that places a force against the body member 2 to secure the insert holder 60 at a particular position, for example, a spring-biased pin. Additionally, the securing force can be imparted by an expander that places an expansion force on the interior of the bore 68 at a side closest to the body member 2 such that the upper and lower sides of the rail guide 61 are pressed against the interior sides 51.

Another alternative configuration of the insert holder 60 is shown in FIG. 2d. In the configuration, materials used in the configuration of FIG. 2d are minimized by only having a thickness stub 66 extending from the rail guide stub 62. To provide the bearing surface of the step 64 shown in FIG. 2c, another thickness stub 67 can be provided (shown in dashed lines). Preferably, both thickness stubs 66, 67 have a thickness equal to the holder overlap thickness t.

Alternatively, the configuration of the rail opening 50 and the rail guide 61 is reversed. Specifically, the insert holder 60 includes the rail opening 50 and the body member includes the rail guide 61.

In another alternative, non-illustrated embodiment, the rail opening 50 is positioned at and projects into the side 54 of the body member 50 and the rail guide 61 is positioned at and projects from the corresponding side 65 of the insert holder 60 shown in FIGS. 2b, 2c, and 2d.

The body member 2, rail openings 50, insert holders 60, and rail guides 61 are not drawn to scale. The dimensions are arbitrary, but, preferably, each insert holder is 2¼ inches wide and 3½ inches high. As the width of the insert holder 60 is many times smaller than the length L of the body member 2, many insert holders 60 can be inserted simultaneously within one rail opening 50 of the body member 2. Also, preferably, the rail guide stub thickness r is ¼-inch wide, and the holder overlap thickness t is ¼-inch wide. Preferably, the interior side 51 is ⅛ to ³⁄₁₆ inches deep and the interior bottom is ½ to ¾ inches wide, the width being defined by the distance between the innermost edge of the two interior sides 51.

As shown in FIG. 3, each of the insert holders 60 has an opening 5 defined by recessed borders (steps) 6. The openings 5 can be formed of any shape, but are illustrated as a square, for example, having dimensions of 1½ inches on a side. Alternatively, the openings 5 can be rectangular, having dimensions of 1½ inches wide by 2 inches high.

The recessed borders 6 are preferably stepped on one side of the insert holder 60. Alternatively, the recessed borders 6 can be on both sides of the insert holder 60 such that the borders 6 take the form of a central flange disposed on sides within the opening 5 and extending towards the center of each opening 5.

FIG. 3 shows the preferred embodiment for the recessed borders 6 of the openings. Therein, the recessed borders 6 have protrusions 28 that have a thickness corresponding to the depth of the recessed border 6. Alternatively, the thickness of the protrusions 28 can be less or more than the depth of the recessed border 6. The protrusions 28 are illustrated as being rectangular. The protrusions 28 can take any shape, including, but not limited to, square, curved, triangular, or trapezoidal. The protrusions 28 are illustrated as extending from the outer edge of the recessed borders 6 all the way to the inner edge of the recessed borders 6. The protrusions 28 can extend alternatively to any distance along the edge of the recessed borders 6.

The opening 5 and the borders 6 are configured to receive a plurality of inserts, which will be discussed in further detail below.

Figure 4A:
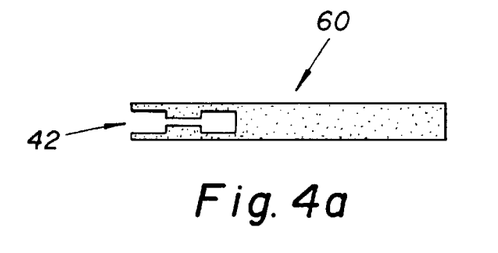
FIG. 4*a* is a diagrammatic, side elevational view of an alternative embodiment of the insert holder of FIGS. 2*b*, 2*c*, 2*d*, or 3 for use with the body member of FIG. 1.
Figure 4B:
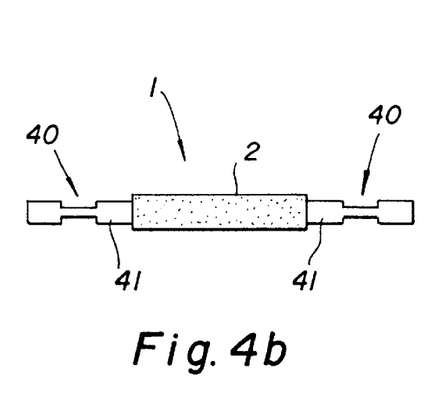
FIG. 4*b* is a diagrammatic, side elevational view of the body member of FIG. 1.

An alternative embodiment of the body member 2 and the insert holder 60 is shown in FIGS. 1, 4a, and 4b. In FIG. 1, the body member 2 is shown with two rails 40 disposed on opposite sides of the body member 2. The rails 40 take the preferred shape of a squared barbell 41 and are depicted in FIG. 4b. The corners of the barbell also can be rounded. A guiding opening 42, the interior of which corresponds to the exterior of the barbell 41, is disposed on a side of the insert holder 60. Preferably, the ends of the rails 40 (taken at the extremities of length L) and the ends of the guiding opening 42 (viewed from an insertion direction) are rounded or tapered to provide easy insertion of the guiding opening 42 onto the rail 40.

Figures 5A, 5B:
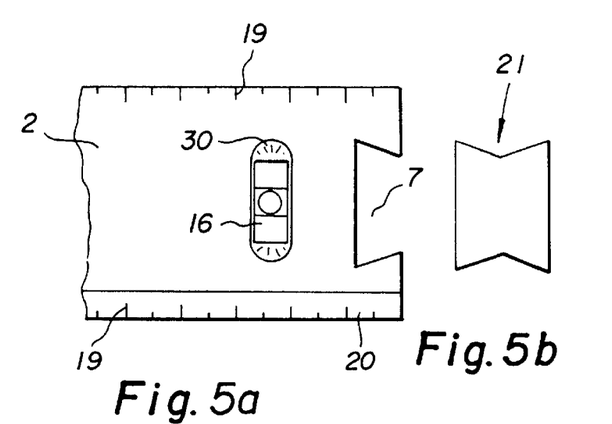
FIG. 5*a* is a diagrammatic, fragmentary, front elevational view of an end portion of the object hanging tool of FIG. 2*a* showing a side opposite rail openings.
FIG. 5*b* is a diagrammatic, front elevational view of an end portion connector of the object hanging tool of FIG. 5*a*.

A view of an end 3, 4 of the body member 2 is shown in FIG. 5a. Preferably, the end 3, 4, of the body member 2 is formed with an end opening 7. The end openings 7 can be formed of any shape, but are illustrated in the preferable embodiment of a trapezoid.

An end connector 21 is shown in FIG. 5b. The end connector 21 is used to attach adjacent object hanging tools 1 together. The end connector 21 can be flat, thus, connecting adjacent object hanging tools 1 in a single plane. Alternatively, the end connector 21 can have two halves disposed at a given angle relative to one another, preferably ninety degrees (90°). Thus, adjacent object hanging tools 1 can be used at a right angled corner of a structure (i.e., a room, a partition, or other object) to hang objects on both of two adjacent walls, for example. As a further alternative, the end connectors 21, 22 can be formed with a non-illustrated hinge to connect adjacent object hanging tools 1 at any angle (i.e., 0° to 360°) with respect to one another. In this manner, the object hanging tool 1 can be used for working in any corner, regardless of the corner angle.

FIG. 5a also shows the object hanging tool 1 having measuring units 19 embedded into the body member 2. The measuring units assist in measuring the length between insert holders 60 or fasteners to be inserted into a structure. As shown in FIG. 5a, the measuring units 19 start at one end of the body member 2. The measuring units form a ruler that preferably runs the entire length L of the body member 2. In addition to being formed directly in the body member 2 as shown in FIG. 5a, the measuring units 19 can be formed on a structural support clip 20. The structural support clip 20 preferably spans the full length L of the body member 2 and provides additional support to the body member 2. For example, if the body member 2 is made of plastic, the structural support clip 20 can be formed of a harder plastic, a metal, a metal alloy, aluminum, or other suitable material, and helps prevent the body member 2 from warping or bending.

Example measuring scales for a three-foot object hanging tool 1 can include both a ruler (0" to 36") and a centering scale. Preferably, the centering scale is configured with a "0" centered on the body member 2 and forms a ruler that runs the entire length L of the body member 2, the ruler measurements increasing from the center outward. Preferably, the center unit is "0" and the other units are increasing even integers radiating in both directions from the "0". See, i.e., FIG. 9. Specifically, each side of the centering scale has units 2, 4, 6, 8, 10, 12, 14, and 16 for a 36" length L. The centering unit assists in measuring the distance between respective inserts or fasteners to be inserted into a structure. Specifically, the centering unit enables a user to easily determine a distance between the center line of two openings 5, and, therefore, two fasteners to be installed.

FIGS. 6a to 6f and 7a to 7h show a plurality of exemplary removable inserts 9-13, 31-33 for placement within the openings 5 and for being held therewithin by the recessed borders 6 of the body member 2. Each of the inserts 9-13, 31-33 preferably has overhanging edges 14 for engaging the recessed borders 6 of the insert holder 60. The overhanging edges 14 define a corresponding recess on one side of each insert (i.e., the rear side of FIGS. 6a to 6f, and the side illustrated in FIGS. 7a to 7e) and along the entire perimeter of each insert 9-13, 31-33. Alternatively, the recess of the overhanging edges 14 can be formed on less than the entire perimeter of the inserts 9-13, 31-33.

Preferably, the overhanging edges 14 and the recessed borders 6 are dimensioned such that the overhanging edges 14 of the inserts 9-13, 31-33 frictionally self-secure to the recessed borders 6 in the openings 5. The perimeter of the overhanging edges can be formed to be slightly oversized with respect to the size of the openings 5. Also, the overhanging edges 14 facing the recessed borders 6 of the openings 5 can be tapered towards the center of the inserts 9-13, 31-33 to permit easier self-securing into the openings 5. The taper 27 is shown, for example, on the level insert 9 of FIG. 7e.

The inserts 9-13, 31-33 are removed from the openings 5 by applying a force to the inserts in a direction opposite to the insertion direction to overcome the frictional forces of the slightly oversized overhang edges 14. It is noted that other equivalent fastening techniques, such as pin and socket devices, could be employed for securing the inserts to the insert holders 60.

Preferably, the recessed borders 6 in the openings 5 and the corresponding recesses around the inserts 9-13, 31-33 together enable the front and back surfaces of the inserts 9-13, 31-33 to lie flush with the front and back surfaces of the insert holders 60 when the inserts 9-13, 31-33 are placed into the openings 5.

Figures 6, 8:
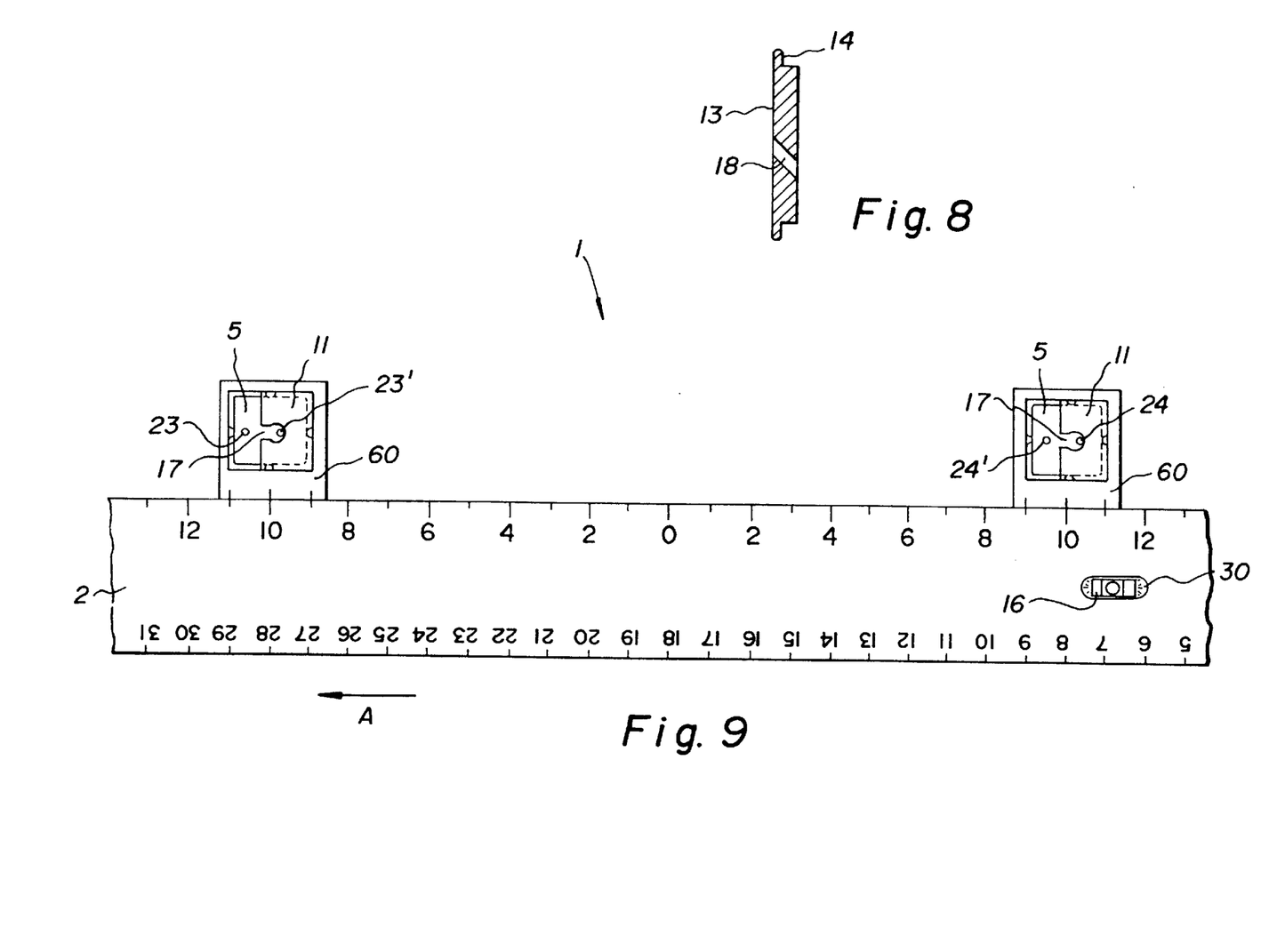
FIG. 8 is a diagrammatic, cross-sectional, side view of an alternative embodiment of FIG. 6d along the line VIII—VIII.
Figure 6A:
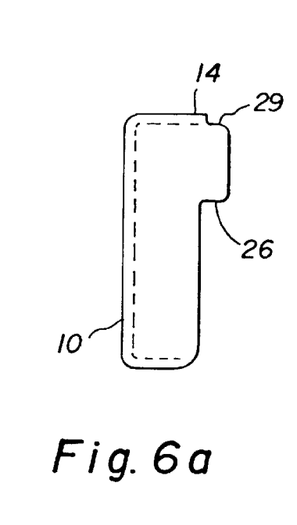
FIGS. 6*a* to 6*f* are each diagrammatic, front elevational views of an insert for the insert holder of FIG. 3.
Figure 6B:
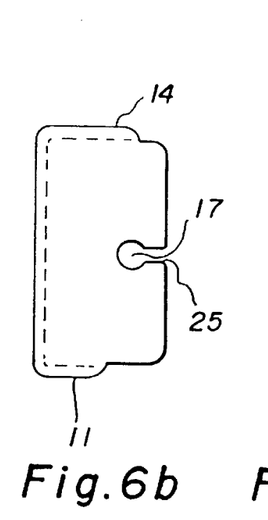
Figures 6C, 6D:
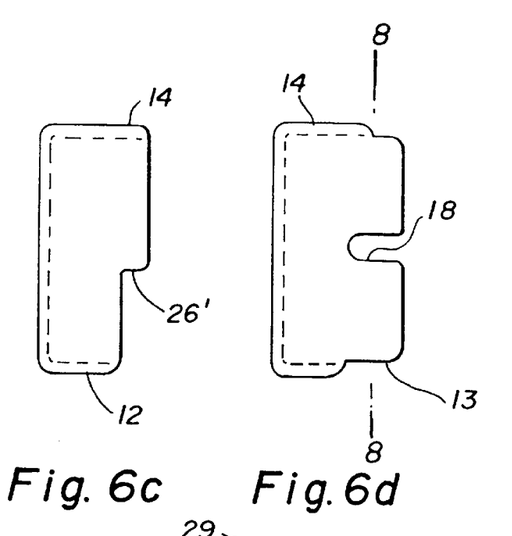
Figure 6E:
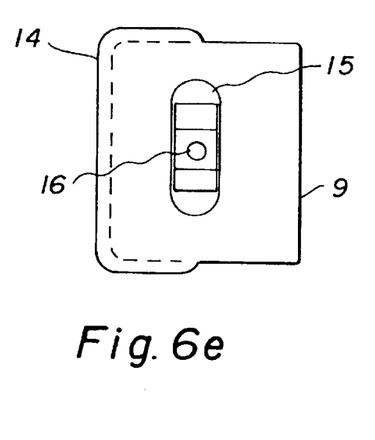
Figure 6F:
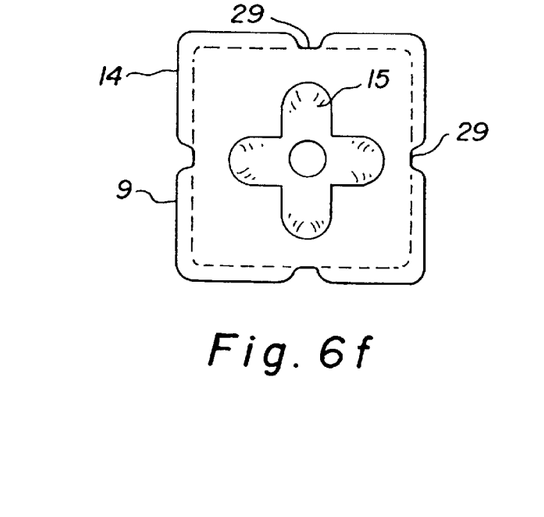
Figure 7A:
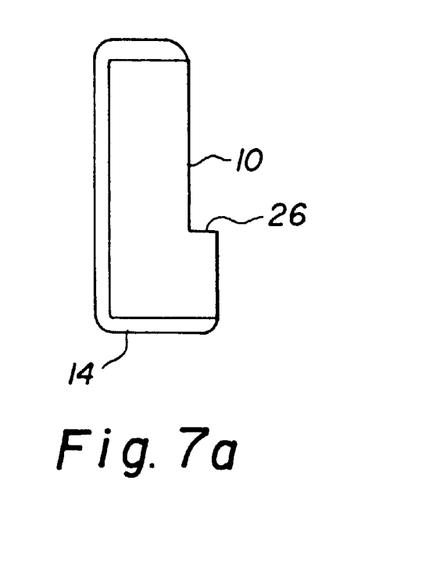
FIG. 7*a* is diagrammatic, rear elevational view of FIG. 6*a*.
Figure 7B:
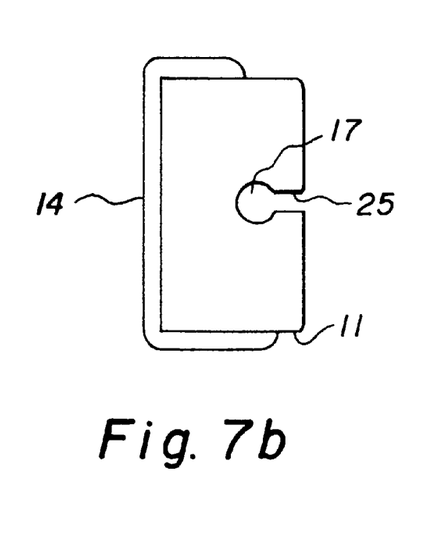
FIG. 7*b* is diagrammatic, rear elevational view of FIG. 6*b*.
Figure 7C:
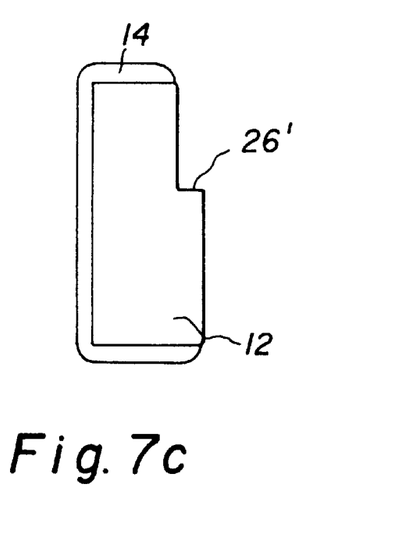
FIG. 7c is a diagrammatic, rear elevational view of FIG. 6c.
Figure 7D:
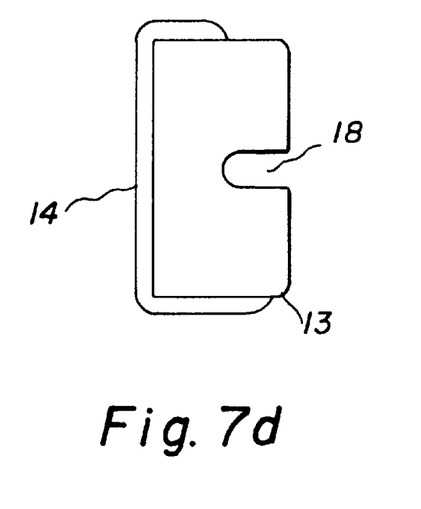
FIG. 7d is diagrammatic, rear elevational view of FIG. 6d.
Figure 7E:
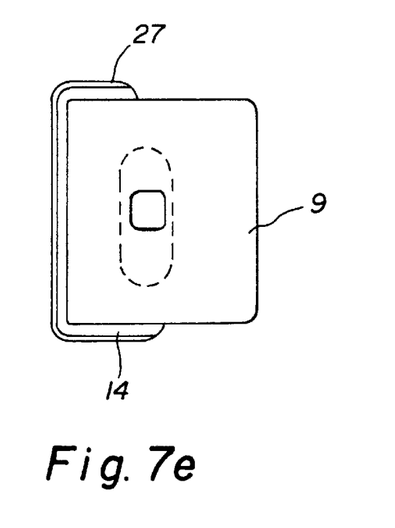
FIG. 7e is diagrammatic, rear elevational view of FIG. 6e.
Figure 7F:
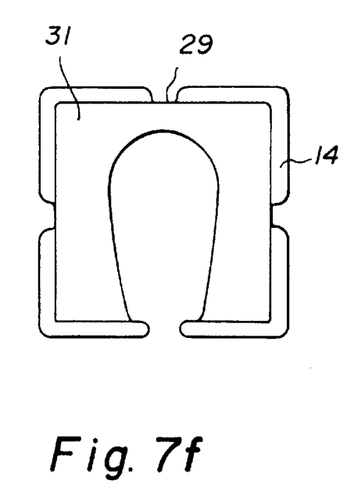
FIGS. 7f to 7h are each diagrammatic, rear elevational views of an insert for the insert holder of FIG. 3.
Figure 7G:
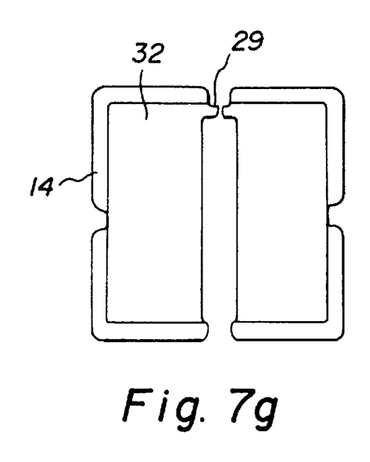
Figure 7H:
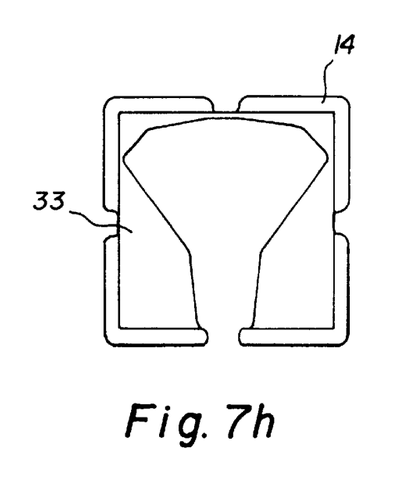

Recesses 29 in the inserts for receiving the protrusions 28 (FIG. 3) are shown, for example, in FIG. 6f and in FIGS. 7f to 7h. The protrusions 28 and corresponding recesses 29, together, form a lock that secures the inserts 9-13, 31-33 within the openings 5 and on the borders 6. Alternatively, the opposite configuration can be provided, e.g., the inserts 9-13, 31-33 can have the protrusions 28 and the recessed borders 6 can have the recesses for receiving the protrusions 28. Further, the inserts 9-13, 31-33 can have a recess on both sides such that each insert has a perimeter with a central flange thereon extending away from the center of the insert. A recess on both sides eliminates the constraint of placing an insert within the openings 5 in only one direction.

The inserts 9-13, 31-33 can be individually removed and placed in an opening 5. The inserts 9-13, 31-33 can be configured for insertion into the opening 5 from either the left side of the opening 5 or the right side of the opening 5. For example, insert 10 is shown in FIG. 6a in a position to be inserted into a left side of an opening 5 (see FIG. 3).

FIGS. 6a to 6f show a front side of a plurality of example inserts 9 to 13, including two examples of a level insert 9, an L-shaped insert 10, a screw or nail insert 11, a stepped insert 12, and a general fastener insert 13. All of the inserts 9 to 13 are shown with overhanging edges 14 for engaging the recessed borders 6 of the body member 2, with the inside corner of the defined recesses shown with dashed lines.

FIGS. 7a to 7h show a rear side of a plurality of example inserts 9-13, 31-33, including a level insert 9, an L-shaped insert 10, a screw or nail insert 11, a stepped insert 12, a general fastener insert 13, and specific fastener inserts 31, 32, 33. Specifically, FIGS. 7a to 7e show the opposite view of inserts 9 to 13 in FIGS. 6a to 6e. All of the inserts 9-13, 31-33 in FIGS. 7a to 7h are shown with overhanging edges 14 for engaging the recessed borders 6 of the insert holder 60. The inside corner of the defined recesses is shown.

A detailed explanation of the individual inserts follows.

The level insert 9 (FIGS. 6e, 6f, 7e) has a recess 15 for receiving and securing a level 16. Preferably, the level 16 is removable. The recess 15 can be oriented to receive the level 16 in any angular direction or in a plurality of directions. Preferably, the level is oriented in a horizontal direction, in a vertical direction, or on a 45-degree angle.

The L-shaped insert 10 (FIGS. 6a, 7a) is configured to guide and receive a fastener such as a bull hook. The distance between the step 26 and the corresponding facing interior side of the opening 5 can define the maximum size of the fastener. Preferably, the distance is equal to or slightly less than the size of the fastener such that the fastener remains removably secured within the insert 10 at the step 26 when inserted into the insert 10 so that the fastener does not fall out during installation. The L-shaped insert 10 can also take the mirror-image form of the configuration shown in FIGS. 6a and 7a. Forming the L-shaped insert 10 in a mirror image allows customized easier use for a right-handed or left-handed user.

The stepped insert 12 (FIGS. 6c, 7c) is formed with an arbitrarily positioned step 26' that is also used to receive and guide fasteners such as bull hooks. As above, the step 26' is selected to removably secure the fastener within the insert 12 when installing the fastener. Because the step 26' can be at any distance between the top and bottom sides of the stepped insert 12, the stepped insert 12 can accommodate various sized fasteners. Alternatively, the insert 12 can be formed without any step such that, for example, a bull hook having a size corresponding to the inside diameter of an opening 5 can be simply placed against the side of the insert 12 (see also FIG. 7g). Likewise, the edges of the openings 5 can be used, for example, to install a bull hook having a size corresponding to the inside diameter of an opening 5.

The screw and nail insert 11 (FIGS. 6b, 7b) is configured with a fastener guide path 25 and an opening 17 for receiving and centering a nail, screw and similar type fasteners. The screw and nail insert 11 can have a keyhole opening as shown in FIGS. 6b, 7b, or can have a non-illustrated semicircular opening.

The general fastener insert 13 (FIGS. 6d, 7d) is provided with a U-shaped opening 18 that receives and centers similar and other types of fasteners including pegs, hooks and mollies. It is noted that the openings 17 and 18 can be of various sizes and shapes to fit various types of fasteners and are not limited to those shown in the drawings. It is also noted that the openings 17, 18 in the inserts 11, 13 can be formed to grip the fastener such that it is held within the opening 17, 18 while the object hanging tool 1 is used. The gripper can include, for example, a particular width or a grommet with an opening, the grommet being made from a gripping substance such as rubber or soft plastic.

Shown in FIGS. 6b and 6d are openings 17, 18 in the inserts 11, 13 having a depth that is perpendicular to the plane of the inserts 11, 13. Alternatively, the openings 17, 18 in the inserts 11, 13 can be at any angle transverse to the plane of the inserts. An example transverse opening angle is shown FIG. 8, which illustrates a cross-sectional view taken along a line VIII—VIII of an insert similar to the general fastener insert 13 in FIG. 6d.

The various inserts 9-13, 31-33 permit the object hanging tool 1 to be adapted to handle any kind of fasteners, including, but not limited to, nails, screws, mollies, hooks, bull hooks, pegs, and the like. For example: insert 31 (FIG. 7f) is configured to receive and removably secure a fastener, typically referred to as a hardwall picture hanger, that has a shape corresponding to the interior shape of the insert; insert 32 (FIG. 7g) is configured in two parts to receive and removably secure a bull hook fastener, the most common type of picture hanger; and insert 33 (FIG. 7h) is configured to receive and removably secure a fastener, typically referred to as a "sturdy hanger" or a "tremor hanger", that has a shape corresponding to the interior shape of the insert.

The object hanging tool 1 is easy to use. First, the type of fastener to be used is determined. For the following example, the fastener will be a nail and two nails will be fastened into a wall level with respect to ground twenty inches apart. The appropriate inserts for the type of fastener used are then selected (here, the screw and nail insert 11) and placed into the appropriate positions in the selected openings 5 of each insert holder 60. For the example, one leveling insert 16 is placed directly in a horizontal insert cavity 30 in the body member 2. The embodiment is illustrated in FIG. 9. In the embodiment, the rail openings 50 are on the rear side or the top side of the body member 2 and, therefore, are not illustrated.

In an alternative, non-illustrated embodiment, one or more level inserts 9 can be placed in one or more insert holders 60, which are then attached either on the same side of the body member 2 as the other insert holders 60 to be used or on the opposite side of the body member 2.

Next, a height at which the object is to be set is determined. A first nail 23, upon which the object will rest, is secured (nailed) into the structure. One end of the object hanging tool 1 is set over the first nail 23 (FIG. 9) in the area of the opening 5 not covered by the insert 11. The object hanging tool 1 is then moved over in the direction of arrow A such that the first nail 23 is now in the opening 17 of the insert 11 in the position shown by reference number 23'.

The object hanging tool 1 is then pivoted about the first nail 23' until the level 16 in the level cavity 30 of the object hanging tool 1 indicates that the object hanging tool 1 is true or level with respect to ground. At this point, the second nail 24 is then placed into the opening 17 of a second insert 11 and secured to the structure. If the nails are to be inserted at an angle with respect to the structure, a screw and nail insert 11 having an inclined opening 18 as shown in FIG. 8 can be used.

The object hanging tool 1 is then moved in a direction opposite arrow A such that the first nail is in the position shown by reference numeral 23 and the second nail is in the position shown by reference number 24'. The object hanging tool 1 is lifted away from the structure leaving two nails in the structure twenty inches apart and level with respect to ground.

Of course, many different variations for using the object hanging tool 1 are possible, and the example is only illustrative for understanding the invention.

A third, fourth, or fifth fastener can be aligned from any of the previously inserted fasteners for inserting multiple fasteners for a single item to be hung or for inserting multiple fasteners for a plurality of items to be hung. In addition, it is noted that the object hanging tool 1 can be placed on a pre-existing fastener already set in the wall.

We claim:

1. An object hanging tool, comprising:
    an elongated body member having at least one edge;
    at least one insert for receiving and guiding a fastener to be secured to a structure, said at least one insert having an overhanging edge; and
    at least one removable insert holder for removably fastening said at least one insert to said body member;
    said at least one insert holder slidably disposed at said at least one edge and having a holder opening with a holder opening edge and a recessed border formed at least partly around said opening edge, said recessed border self-securing to said overhanging edge of said at least one insert upon placing said at least one insert into said holder opening.

2. The object hanging tool according to claim 1, wherein said body member has at least one rail opening, said at least one insert holder has at least one rail guide, and said at least one rail guide is slidably disposed in said at least one rail opening.

3. The object hanging tool according to claim 2, wherein said body member has a rear side, said at least one insert holder has a front side, said at least one rail guide is on said front side, and said at least one rail opening is on said rear side.

4. The object hanging tool according to claim 2, wherein said body member has a top side, said at least one insert holder has a bottom side, said at least one rail guide is on said bottom side, and said at least one rail opening is on said top side.

5. The object hanging tool according to claim 2, wherein said at least one rail opening and said at least one rail guide are trapezoidal.

6. The object hanging tool according to claim 2, wherein said at least one rail opening and said at least one rail guide are barbell shaped.

7. The object hanging tool according to claim 2, wherein said at least one rail opening has entrance edges and said entrance edges are tapered.

8. The object hanging tool according to claim 2, wherein said at least one rail guide has end edges and said end edges are tapered.

9. The object hanging tool according to claim 1, wherein said at least one insert holder has at least one rail opening, said body member has at least one rail guide, and said at least one rail guide is slidably disposed in said at least one rail opening.

10. The object hanging tool according to claim 9, wherein said body member has a rear side, said at least one insert holder has a front side, said at least one rail guide is on said rear side, and said at least one rail opening is on said front side.

11. The object hanging tool according to claim 9, wherein said body member has a top side, said at least one insert holder has a bottom side, said at least one rail guide is on said top side, and said at least one rail opening is on said bottom side.

12. The object hanging tool according to claim 9, wherein said at least one rail opening and said at least one rail guide are trapezoidal.

13. The object hanging tool according to claim 9, wherein said at least one rail opening and said at least one rail guide are barbell shaped.

14. The object hanging tool according to claim 9, wherein said at least one rail opening has entrance edges and said entrance edges are tapered.

15. The object hanging tool according to claim 9, wherein said at least one rail guide has end edges and said end edges are tapered.

16. The object hanging tool according to claim 1, wherein said body member has a given thickness and said at least one insert holder has a thickness equal to said given thickness.

17. The object hanging tool according to claim 1, wherein said body member has a given thickness and said at least one insert holder has at least one step with a width equal to said given thickness.

18. The object hanging tool according to claim 1, wherein said body member has two edges, and said at least one insert holder is slidably disposed on at least one of said two edges.

19. The object hanging tool according to claim 1, wherein said recessed border is formed with at least one protrusion and said overhanging edge is formed with at least one recess aligned with and corresponding to said at least one protrusion for removably fastening said at least one insert to said at least one insert holder.

20. The object hanging tool according to claim 19, wherein said recessed border has a depth and said at least one protrusion has a thickness corresponding to said depth of said recessed border.

21. The object hanging tool according to claim 19, wherein said at least one protrusion and said at least one recess are curved.

22. The object hanging tool according to claim 19, wherein said at least one protrusion has a width, said recessed border has a breadth, and said width corresponds to said breadth.

23. The object hanging tool according to claim 1, wherein said overhanging edge has said at least one protrusion and said recessed border has said at least one recess aligned with and corresponding to said at least one protrusion for removably fastening said at least one insert to said body member.

24. The object hanging tool according to claim 23, wherein said recessed border has a depth and said at least one protrusion has a thickness corresponding to said depth of said recessed border.

25. The object hanging tool according to claim 23, wherein said at least one protrusion and said at least one recess are curved.

26. The object hanging tool according to claim 23, wherein said at least one protrusion has a width, said recessed border has a breadth, and said width corresponds to said breadth.

27. The object hanging tool according to claim 1, wherein said recessed border has a border shape, said overhanging edge has an edge shape, and said border shape substantially corresponds to said edge shape.

28. The object hanging tool according to claim 1, wherein said recessed border has a border shape, said overhanging edge has an edge shape, and said edge shape is larger than said border shape.

29. The object hanging tool according to claim 1, wherein said overhanging edge has a tapered corner.

30. The object hanging tool according to claim 1, wherein said at least one insert has a front side and a back side, said at least one insert holder has a front side and a back side, and said recessed border and said front and back sides of said at least one insert respectively lie flush with said front and back sides of said at least one insert holder when said at least one insert is placed into said opening of said at least one insert holder.

31. The object hanging tool according to claim 1, wherein said at least one insert is one of a plurality of inserts including a leveling insert having a level for determining if a plurality of fasteners are aligned level with respect to each other, and a fastener guiding insert for receiving and aligning a fastener.

32. The object hanging tool according to claim 31, wherein said leveling insert has a removable level.

33. The object hanging tool according to claim 32, wherein said leveling insert has a recess for receiving said level oriented at an angle.

34. The object hanging tool according to claim 31, wherein said fastener guiding insert has a fastener guide path and a semicircular hole at said fastener guide path for receiving and guiding the fastener, and said semicircular hole releasably grips the fastener.

35. The object hanging tool according to claim 1, wherein said elongated body member has at least one cavity and includes at least one level removably disposed in said at least one cavity.

36. The object hanging tool according to claim 1, wherein said body member has at least one end with an end opening formed therein, and including an end connector received in said end opening of said body member for removably joining adjacent body members together at an angle with respect to one another.

37. The object hanging tool according to claim 1, wherein said at least one insert holder has a front side and a back side, and said recessed border is at least partly around said opening edge on both said front side and said back side of said at least one insert holder.

38. The object hanging tool according to claim 1, including at least one measurement scale at said at least one edge.

39. The object hanging tool according to claim 1, wherein said recessed border is entirely around said opening edge.

40. The object hanging tool according to claim 1, wherein said at least one removable insert holder includes a fastener for removably securing said at least one removable insert holder to said body member.

* * * * *